United States Patent Office 3,119,231
Patented Jan. 28, 1964

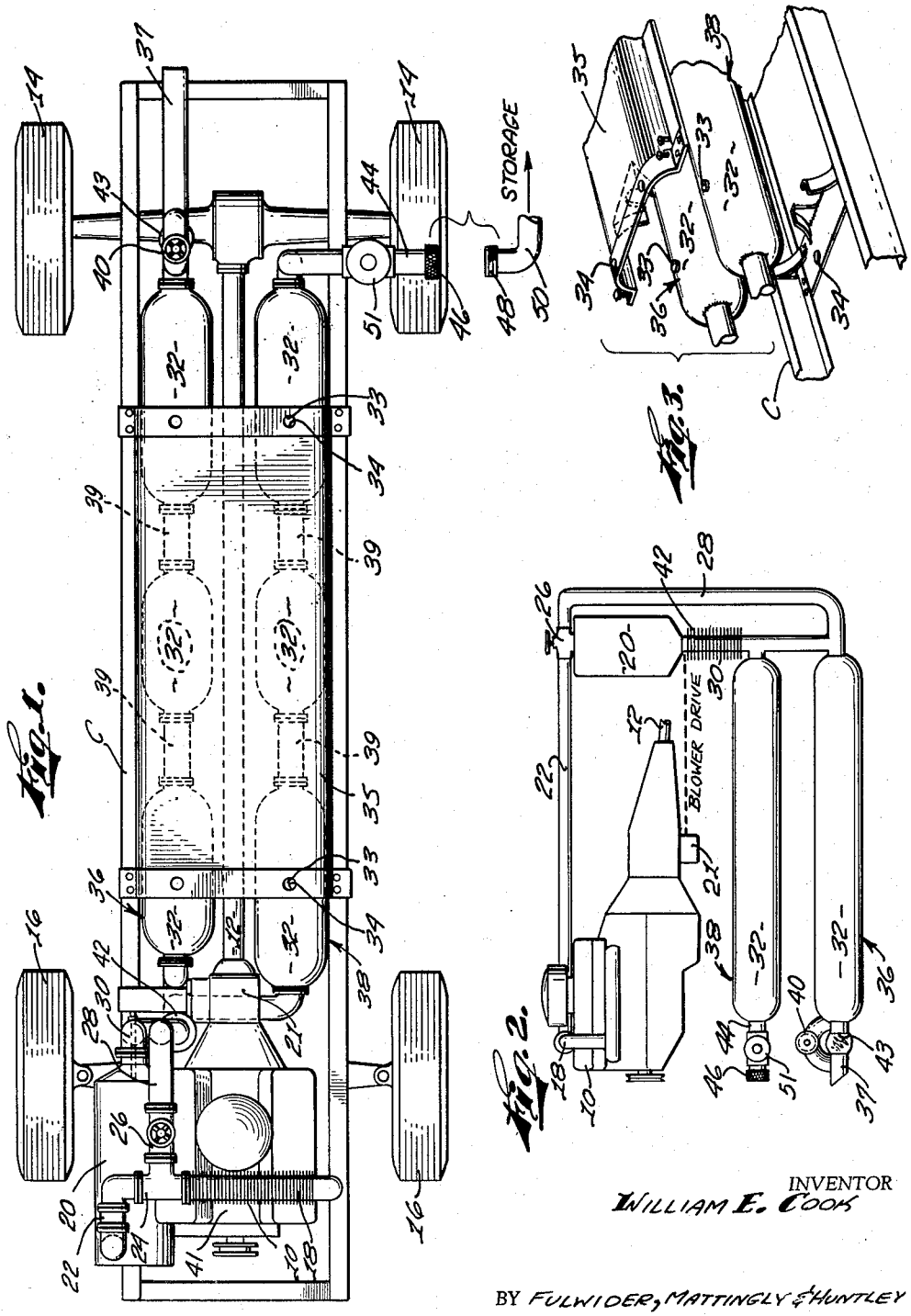

3,119,231
APPARATUS FOR PREVENTING DISCHARGE OF CONTAMINANTS FROM AN AUTOMOTIVE VEHICLE
William E. Cook, 6614 Valjean Ave., Van Nuys, Calif.
Filed Jan. 23, 1961, Ser. No. 84,400
4 Claims. (Cl. 60—29)

The present invention relates generally to automotive vehicles and more particularly to novel apparatus for preventing the discharge of contaminants therefrom into the atmosphere.

It is well-known that the discharge of exhaust gas contaminants from the internal combustion engines of automotive vehicles create serious problems in the larger population centers of the country. Such contaminants endanger the health of the populace as well as creating an unpleasant and uncomfortable atmosphere in which to live and work. These contaminants also have an adverse effect on crops and all forms of animate and inanimate objects.

While many devices have been heretofore proposed for preventing the discharge of these contaminants into the atmosphere, none have been proven satisfactory in actual use. Such devices, even though expensive and complex, fail to eliminate discharge of such contaminants.

It is a major object of the present invention to provide apparatus for preventing discharge of exhaust gas contaminants from automotive vehicles into the atmosphere.

Another object is to provide apparatus of the aforedescribed nature capable of preventing any and all discharge of such contaminants.

Yet another object is to provide such apparatus which is completely foolproof in operation and will provide a long and trouble-free service life.

An additional object is to provide apparatus of the aforedescribed nature that readily lends itself to installation on existing automotive vehicles or alternatively may be installed on new vehicles.

More particularly, it is an object of the present invention to provide apparatus of the aforedescribed nature that utilizes storage containers built into the automotive vehicle to receive the exhaust gases thereof with compressor means being employed to force such exhaust gases into such storage containers. These containers are then emptied into a suitable receiver at periodic intervals. Means are provided to insure the stored exhaust gases will be emptied from such containers at a safe pressure.

These and other objects and advantages of the present invention will become apparent from the following detailed description, when taken in conjunction with the appended drawings wherein:

FIGURE 1 is a top plan view showing a preferred form of apparatus embodying the present invention;

FIGURE 2 is a diagrammatic showing of the mode of operation of said apparatus; and FIGURE 3 is a vertically exploded view showing the manner of mounting the storage tanks of said apparatus in an automotive vehicle.

Referring to the drawings and particularly FIGURE 1 thereof, there is shown an automotive vehicle chassis C of conventional construction. An internal combustion engine 10 is mounted at the forward portion of the chassis C so as to rotate a drive shaft 12 connected to rear wheels 14. Steerable front wheels 16 are likewise provided. The engine 10 has an exhaust cross-over manifold 18.

Pump means such as a rotary compressor or blower 20 of conventional construction is mounted on the chassis C adjacent the engine 10. This compressor 20 is suitably coupled to the engine 10 as by a power take-off 21 so as to be operated thereby. The exact manner of effecting such operation is not important with respect to the scope of the present invention. The intake of the compressor 20 is located at the front portion thereof and receives exhaust gases from the engine 10 by means of tubing 22 connected to the exhaust cross-over manifold 18, as by a T-fitting 24. The rear end of this fitting 24 is connected to a manually operated by-pass valve 26. The opposite side of the by-pass valve 26 is connected to a by-pass tube 28. The discharge of the compressor 20 is disposed at the rear end of the latter and is in communication with a discharge tube 30.

A plurality of storage bottles or tanks 32 are suitably supported by the chassis C. These tanks 32 are preferably formed of metal. As indicated in FIGURES 1 and 3, the upper portion of certain of these tanks 32 are formed with vertically projecting nodes or bosses 33 which are received by complementary bores 34 formed in the reinforced front and rear edges of cross-decking members 35. These cross-decking members 35 are rigidly affixed to the chassis C by suitable means. The positioning of the nodes or bosses 33 within the bores 34 serve to positively lock the tanks 32 against inadvertent longitudinal movement relative to the chassis. Preferably, two longitudinally aligned rows of tanks 36 and 38 are provided, the ends of adjacent tanks being connected by short tube lengths 39. Preferably, suitable heat insulating material (not shown) will be interposed between the tanks 32 and the passenger compartment of the automotive vehicle.

It is also preferable that a first heat exchanger 41 be provided in the tubing 22 and a second heat exchanger 42 be provided in discharge tube 30. These heat exchangers may be of conventional construction. The utilization of these heat exchangers 41 and 42 will serve to reduce the temperature of the exhaust gases in the system.

The front end of the tank row 36 is connected with the aforedescribed by-pass tube 28 as well as with the discharge tube 30. The rear end of this tank row 36 is connected to a tailpipe 37. A release valve 40 is disposed in this tailpipe 37 so as to control the flow of exhaust gases therethrough. In this regard the valve 40 is arranged so as to be manually opened when desired whereby the tank system may be purged, or alternatively, to permit the exhaust gases to be released to the atmosphere when the automotive vehicle is travelling in areas wherein air contamination is not a problem. A conventional pressure relief valve 43 is also provided in the tailpipe 37, which valve serves as a safety measure to prevent an excessive pressure build-up in the tank system.

The front end of the other tank row 38 is also connected with the discharge tube 30 from the compressor 20. The rear end of this tank row 38 is connected with a release tube 44 having its end normally closed by a cover fitting 46. This cover fitting 46 is arranged to be connected with a complementary fitting 48 of a tube 50 that leads to a storage chamber (not shown), as indicated in FIGURE 1. Preferably a conventional constant pressure outlet valve 51 will be interposed in the release tube 44 upstream of the cover fitting 46. This valve 51 serves to reduce the pressure of the gases being emptied from the tanks 32 to a predetermined safe value. It will be understood that such arrangement will prevent injury should the cover fitting be inadvertently removed while the tanks 32 are highly pressurized.

In the operation of the aforedescribed apparatus the by-pass valve 26 and the release valve 40 are normally in closed position. Accordingly, the exhaust gases from the engine 10 will be forced by the compressor 20 into the tank rows 36 and 38. It will be readily apparent that all of the exhaust gases will in this manner be prevented from entering the atmosphere. Periodically the stored exhaust gases will be withdrawn from the tank rows. This is accomplished by coupling the fittings 46 and 48. The tube 50 then conducts the stored exhaust gases to a large storage chamber which is sealed to the atmosphere. Conveniently, such storage chambers may be disposed at service stations in order that the removal of the stored exhaust gases can be effectuated concurrently with the servicing of the automotive vehicle with gasoline and other necessities. Should the automotive vehicle be operated in areas wherein air contamination is not a problem the by-pass valve 26 and release valve 40 are opened whereby the exhaust gases will flow through the by-pass tube 28 into the tank row 36 and out of the tailpipe 37. At this time the compressor 20 may be rendered inoperative.

Although the storage tanks 32 are shown disposed within the lower portion of the chassis, it will be understood that other arrangements for storing the exhaust gases may be provided. As for example, storage tanks may be incorporated in the vehicle's trunk. Also, the aforedescribed apparatus may be used with stationary engines. Various other modifications may be made with respect to the aforedescribed description without departing from the spirit of the invention of the scope of the following claims.

This is a continuation-in-part of my application Serial No. 832,850 filed August 10, 1959, now abandoned.

I claim:

1. Apparatus for preventing the discharge into the atmosphere of exhaust gas contaminants from the internal combustion engine of an automotive vehicle, said apparatus being usable in conjunction with storage chamber means sealed to the atmosphere and normally independent of said automobile, comprising: storage tank means carried by the chassis of said automotive vehicle below the passenger compartment of said vehicle; a tailpipe for connecting said storage tank means with the atmosphere; pressure release valve means operatively connected with said tailpipe to automatically connect said storage tank means with the atmosphere when the pressure therewithin exceeds a predetermined value; compressor means; drive means connecting said engine to said compressor means; conduit means connecting said engine, compressor means and storage tank means whereby said compressor receives the exhaust gases from said engine and forces said gases into said storage tank means; selectively operable valve means that connects said conduit means with the atmosphere when said gases are not to be received by said storage tank means; a release tube in communication with said storage tank means, said release tube being selectively connectible to said storage chamber means for periodically emptying the contents of said storage tank means into said storage chamber means; and cover means normally closing said release tube, with said cover means being removed when said release tube is to be placed in communication with said storage chamber means.

2. Apparatus for preventing the discharge into the atmosphere of exhaust gas contaminants from the internal combustion engine of an automotive vehicle, said apparatus being usable in conjunction with storage chamber means sealed to the atmosphere and normally independent of said automobile, comprising: storage tank means carried by the chassis of said automotive vehicle below the passenger compartment of said vehicle; a tailpipe for connecting said storage tank means with the atmosphere; pressure release valve means operatively connected with said tailpipe to automatically connect said storage tank means with the atmosphere when the pressure therewithin exceeds a predetermined value; compressor means; drive means connecting said engine to said compressor means; conduit means connecting said engine, compressor means and storage tank means whereby said compressor receives the exhaust gases from said engine and forces said gases into said storage tank means; selectively operable valve means that connects said conduit means with the atmosphere when said gases are not to be received by said storage tank means; a release tube in communication with said storage tank means, said release tube being selectively connectible to said storage chamber means for periodically emptying the contents of said storage tank means into said storage chamber means; cover means normally closing said release tube, with said cover means being removed when said release tube is to be placed in communication with said storage chamber means; and a constant pressure outlet valve in said release tube to reduce the pressure of said gases discharged through said release tube to a predetermined value.

3. Apparatus for preventing the discharge into the atmosphere of exhaust gas contaminants from the internal combustion engine of an automotive vehicle, said apparatus being usable in conjunction with storage chamber means sealed to the atmosphere and normally independent of said automobile, comprising: storage tank means carried by the chassis of said automotive vehicle below the passenger compartment of said vehicle; a tailpipe for connecting said storage tank means with the atmosphere; pressure release valve means operatively connected with said tailpipe to automatically connect said storage tank means with the atmosphere when the pressure therewithin exceeds a predetermined value; compressor means; drive means connecting said engine to said compressor means; conduit means connecting said engine, compressor means and storage tank means whereby said compressor receives the exhaust gases from said engine and forces said gases into said storage tank means; heat exchanger means in said conduit means; selectively operable valve means that connects said conduit means with the atmosphere when said gases are not to be received by said storage tank means; a release tube in communication with said storage tank means, said release tube being selectively connectible to said storage chamber means for periodically emptying the contents of said storage tank means into said storage chamber means; and cover means normally closing said release tube, with said cover means being removed when said release tube is to be placed in communication with said storage chamber means.

4. Apparatus for preventing the discharge into the atmosphere of exhaust gas contaminants from the internal combustion engine of an automotive vehicle, said apparatus being usable in conjunction with storage chamber means sealed to the atmosphere and normally independent of said automobile, comprising: storage tank means carried by the chassis of said automotive vehicle below the passenger compartment of said vehicle; a tailpipe for connecting said storage tank means with the atmosphere; pressure release valve means operatively connected with said tailpipe to automatically connect said storage tank means with the atmosphere when the pressure therewithin exceeds a predetermined value; compressor means; drive means connecting said engine to said compressor means; conduit means connecting said engine, compressor means and tsorage tank means whereby said compressor receives the exhaust gases from said engine and forces said gases into said storage tank means; heat exchanger means in said conduit means; selectively operable valve means that connects said conduit means with the atmosphere when said gases are not to be received by said storage tank means; a release tube in communication with said storage tank means, said release tube being selectively connectible to said storage chamber means for periodically emptying the contents of said storage tank means into said storage chamber means; cover means normally closing said release tube, with said cover means being removed when said release tube is to be placed in communication with said storage chamber means; and a constant pressure outlet valve in said release tube to reduce the pressure of said gases discharged through said release tube to a predetermined value.

References Cited in the file of this patent

UNITED STATES PATENTS

| | | |
|---|---|---|
| 1,143,395 | Hole | June 15, 1915 |
| 1,363,001 | Lockhart | Dec. 21, 1920 |
| 2,116,434 | Hollister | May 3, 1938 |
| 2,166,591 | Hollister | July 18, 1939 |
| 2,668,555 | Bartolat | Feb. 9, 1954 |
| 2,966,036 | Stowens | Dec. 27, 1960 |